US007341305B2

(12) United States Patent
Reynard

(10) Patent No.: US 7,341,305 B2
(45) Date of Patent: Mar. 11, 2008

(54) CUSTOMS SEAL FOR FREIGHT CONTAINER DOOR

(76) Inventor: Kenneth Reynard, Unit 7, Carlton Miniott Business Park, Carlton Road, Thirsk (GB) YO7 4NF ( * ) Notice: Subject to any disclaimer, the term of this patent is extended or adjusted under 35 U.S.C. 154(b) by 49 days.

(21) Appl. No.: 10/566,023

(22) PCT Filed: May 24, 2004

(86) PCT No.: PCT/GB2004/002220

§ 371 (c)(1),
(2), (4) Date: Jan. 25, 2006

(87) PCT Pub. No.: WO2004/103860

PCT Pub. Date: Dec. 2, 2004

(65) Prior Publication Data

US 2007/0108795 A1 May 17, 2007

(30) Foreign Application Priority Data

May 24, 2003 (GB) ................................ 0312023.5

(51) Int. Cl.
*B60J 5/10* (2006.01)
*E05D 11/06* (2006.01)

(52) U.S. Cl. ................. 296/186.4; 220/1.5; 292/307 R

(58) Field of Classification Search ............ 292/307 R, 292/211, 286, 297, 327, 328, 329, DIG. 32; 296/146.1, 146.8, 146.9, 146.11, 186.4; 16/231, 16/348, 353; 220/1.5
See application file for complete search history.

(56) References Cited

U.S. PATENT DOCUMENTS 3,210,118 A 10/1965 Chieger
5,931,033 A * 8/1999 Lanigan et al. ............... 70/256
6,406,074 B1 * 6/2002 Mahaney .................... 292/327

FOREIGN PATENT DOCUMENTS

| | | |
|---|---|---|
| DE | 32 45 205 | 7/1983 |
| DE | 33 41 855 | 6/1985 |
| GB | 2 276 417 | 9/1994 |
| GB | 2 320 054 | 6/1998 |

OTHER PUBLICATIONS

English Translation form the European Patent Office website for DE 3341855 (Copy included).*

* cited by examiner

*Primary Examiner*—Dennis Pedder
*Assistant Examiner*—Melissa Black
(74) *Attorney, Agent, or Firm*—Kirton & McKonkie; Evan R. Witt

(57) ABSTRACT

The present invention comprises: a freight container having two access doors hingedly mounted at one end of the container via respective sets of hinges and mounting brackets which connect one edge of each door to a respective container door post; characterised in that at least one hinge and corresponding mounting bracket have cooperating receiving locations arranged to receive a customs seal when the corresponding door is in a closed position.

4 Claims, 3 Drawing Sheets

CUSTOMS SEAL FOR FREIGHT CONTAINER DOOR

BACKGROUND OF THE INVENTION

This invention relates to a customs seal for a freight container door.

As is well known, a freight container usually has two access doors hingedly mounted at one end of the container via respective sets of hinges and mounting brackets which connect one edge of each door to a respective container door post.

Usually, latching elements and locking bars are provided to maintain the doors in the closed position.

For almost fifty years, goods have been moved around the world in freight or shipping containers. The dimensions of such containers have been established and controlled by the International Standards Organisation (ISO). Similarly, standards of locking and sealing the containers against illegal entry, or insertion of contraband after the container has been closed by the shipper, have long been established by Transport International Routiers (TIR).

The doors of such containers have always been the most vulnerable area for illegal entry into the cargo space. Until recently, it was assumed that the current practice of using two doors, commonly of steel construction, hingedly mounted to the vertical posts of the container at several positions (with the hinge pivot pins welded in position during construction so as to render them impossible to remove without significant mechanical damage) would be a satisfactory safeguard, as any damage done would be obvious at customs inspection.

To secure the doors in the locked position, one or two locking bars on each door are typically welded or bolted, each locking barbeing fitted with a cam at each end which engages with a keeper which is welded to the horizontal members at the top and bottom of the frame of the container. The locking bar is pivotally mounted, and a handle is provided by means of which the cams can be rotated from the open to the locked position. In the locked position, a handle latch is provided whereby the handle can be retained in position. Holes are provided in the latch and the handle, which are in line when the door is locked, and which allows the insertion of a proprietory customs seal.

Again, it has been assumed that container doors built and sealed in such a manner could not be opened without either breaking the seals, or doing sufficient mechanical damage that illegal entry would be obvious on inspection.

It has also been accepted practice to fit only one customs seal in the handle of the bar nearest to the centre of the container, on the right hand door, as this door is usually designed to overlap the left-hand door and must be opened first.

However, recently a major problem has arisen with current designs of containers. With the availability of high powered battery-operated hacksaws, and sophisticated adhesives commonly known as “liquid metal”, it has become relatively easy to cut through the cams of the locking bar which has the customs seal, such cutting action being carried out adjacent to the mounting bracket. It is then possible to open the doors by actuating the handles of the locking bars that have not been sealed, leaving the customs seal intact.

Upon subsequent closing of the doors, when illegal entry into the container has taken place, a small amount of liquid metal can be applied to the saw cut, and the joint is re-made, leaving the container apparently unaltered, unless a detailed inspection is carried out.

The present invention seeks to address this problem in a simple and unique manner.

BRIEF SUMMARY OF THE INVENTION

According to the invention, there is provided a freight container as defined in claim 1.

Preferred features of the invention are set out in the dependent claims.

BRIEF SUMMARY OF THE DRAWINGS

A preferred embodiment of the invention will now be described in detail, by way of example only, with reference to the accompanying drawings, in which.

DETAILED DESCRIPTION OF THE INVENTION

Figure 1:
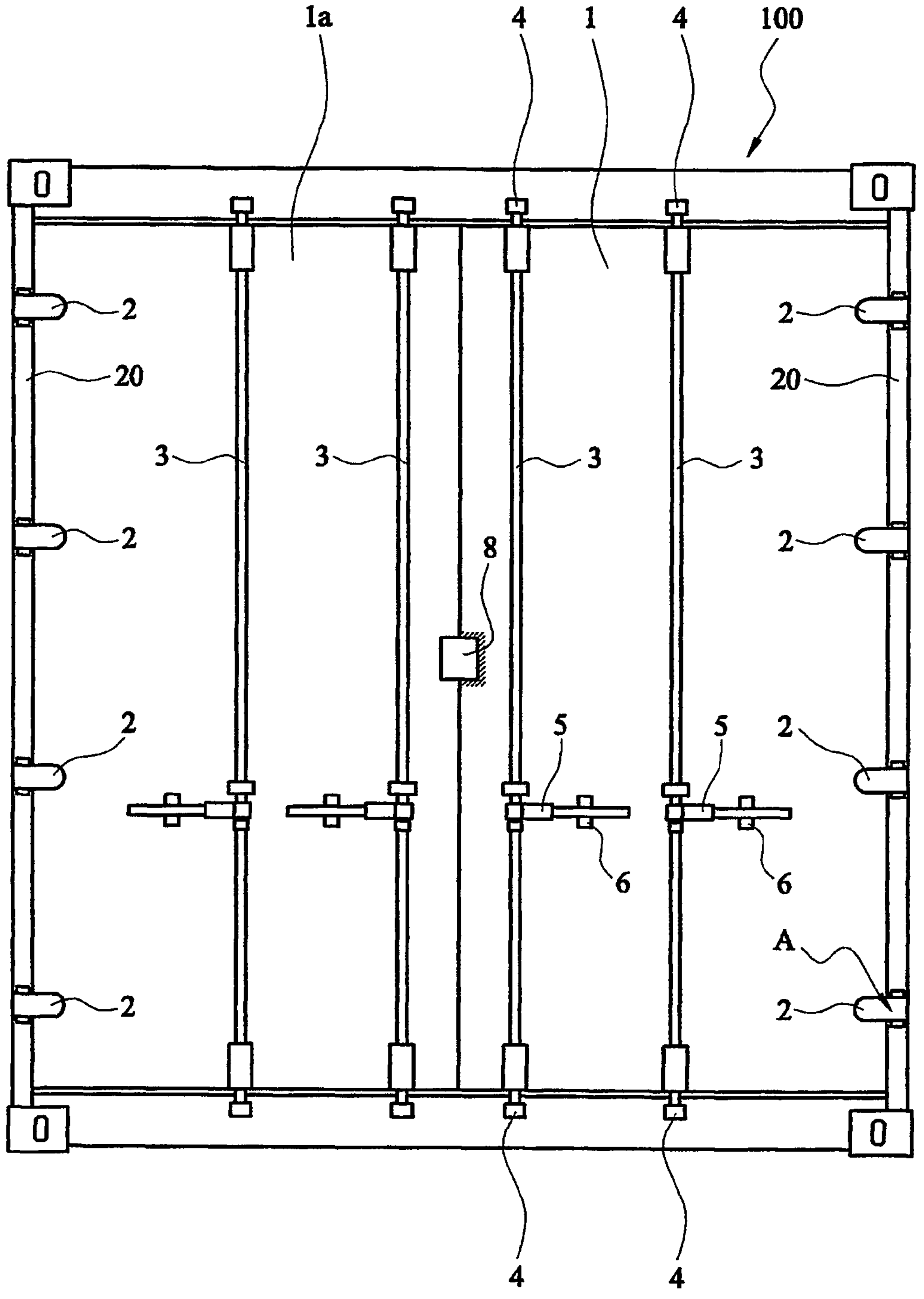
FIG. 1 is a view from one end of a typical ISO shipping container end frame, having two openable doors, hinges, locking bars, cams and keepers, operating handle, and handle latch and also provided with a standard customs seal provision, to which the invention may be applied.
Figure 2:
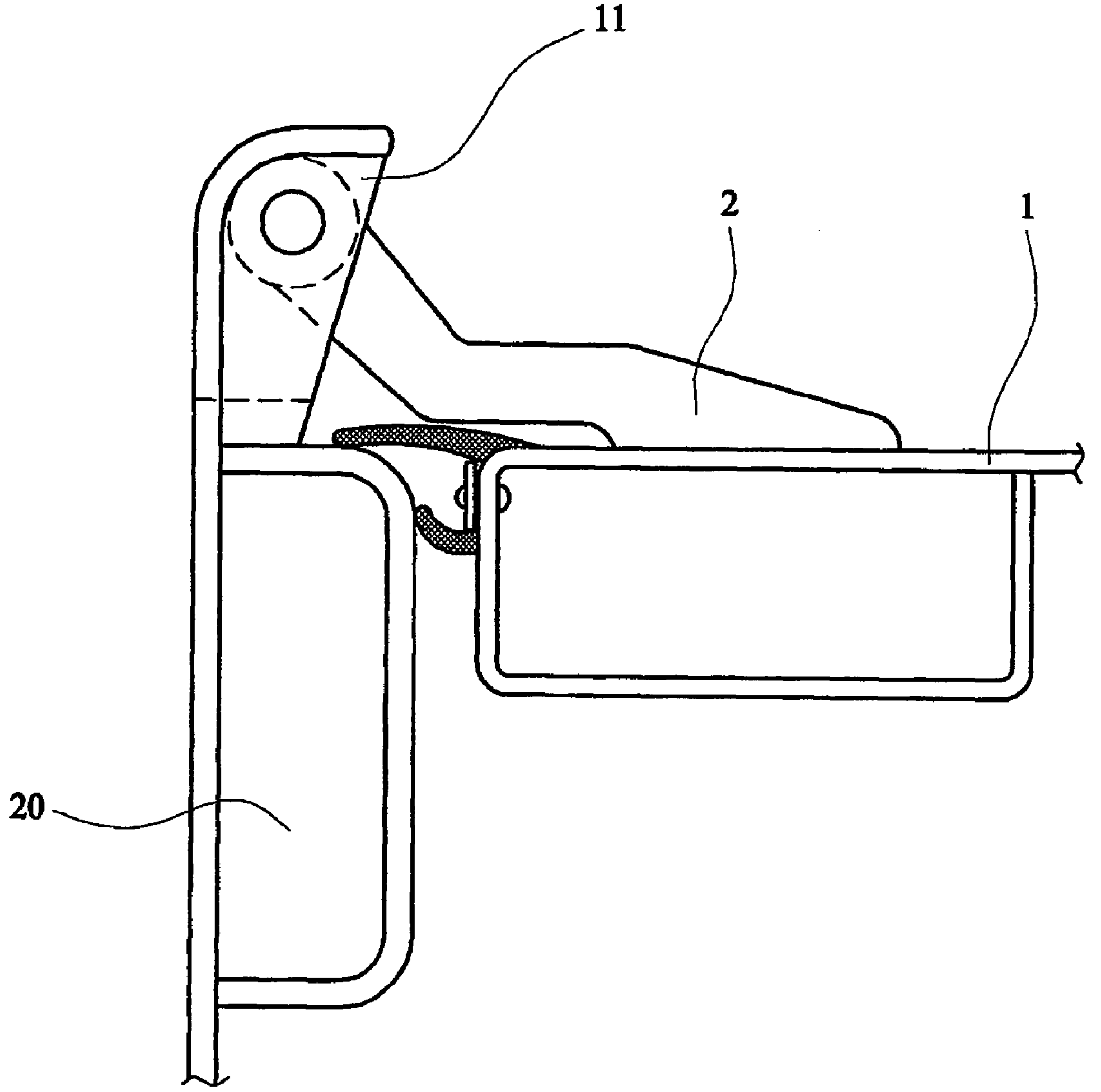
FIG. 2 is a typical cross-section through the container door post, door and hinge as used at present in the container of FIG. 1.

Referring firstly to FIGS. 1 and 2 of the drawings, a typical ISO shipping container (100) will be described, to serve as background to the invention, and with which a novel hinge assembly and bracket with customs seal provision may be incorporated.

The hinge assembly of the invention may be used on ISO shipping containers, and similarly constructed shipping and storage containers, to provide increased security at minimal extra cost.

The container (100) shown in FIG. 1 has a pair of openable doors (1,1*a*) with the right-hand door (1) having an overlap plate (8), or similar structure, to ensure that one door cannot be opened until the primary door has been opened. The end frame of the container includes the usual vertical posts (20) on which the container doors (1,1*a*) are hingeably mounted via hinges (2) and brackets (11). The doors are also provided with locking bars (3), cams and keepers (4), an operating handle (5), and a handle latch with standard customs seal provision (6) in typical existing container design.

Figure 3:
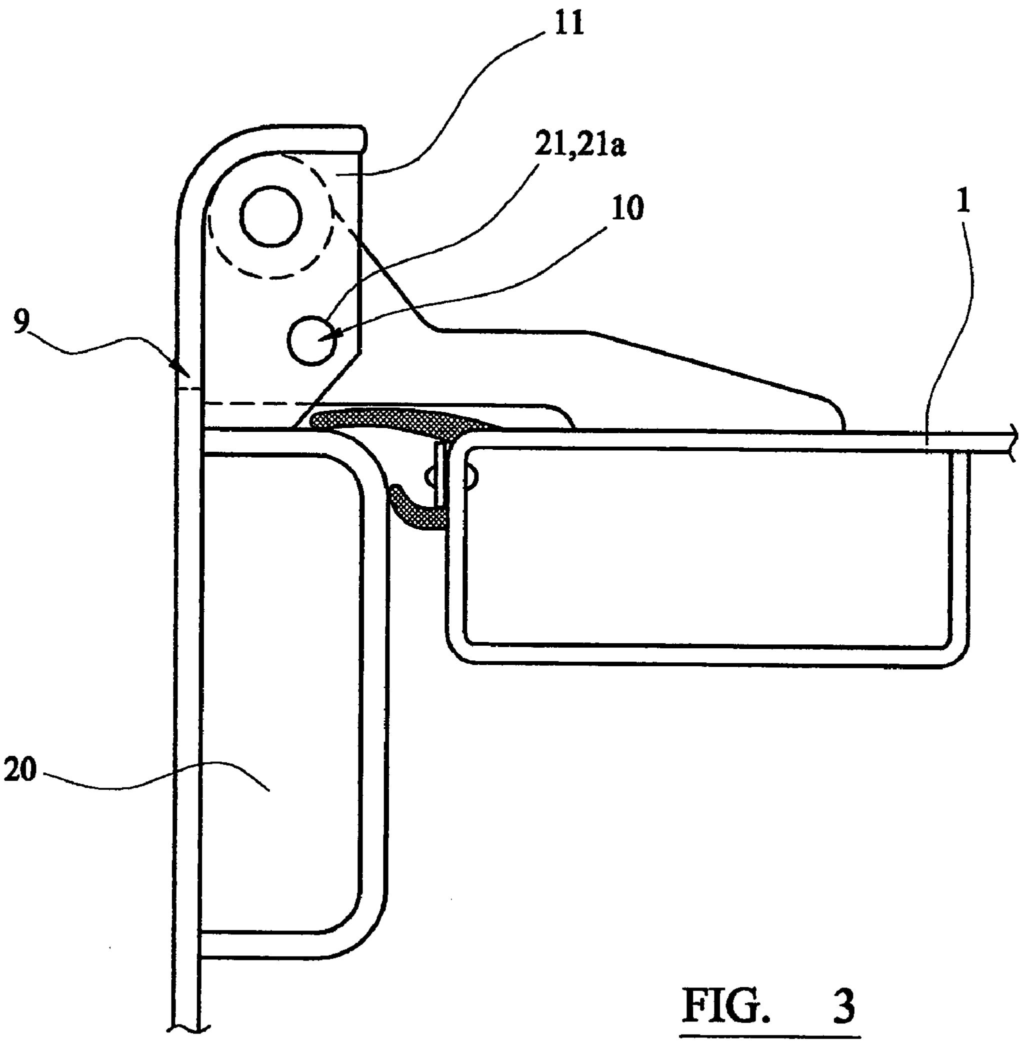
FIG. 3 is a section of a novel hinge and bracket assembly provided with customs seal provision, to be provided in a freight container according to the invention.
Figure 4:
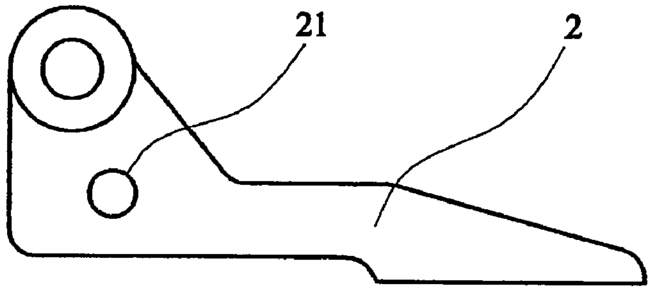
FIG. 4 is a cross-section of the novel hinge shown in FIG. 3.

As shown in more detail in FIGS. 3 and 4, a hinge and bracket assembly may be provided, which can be incorporated in a freight container according to the invention, to provide a novel, inventively different and technically advantageous customs seal arrangement incorporated within the hinge and bracket assembly.

The incorporation of the novel hinge assembly on the freight container (100) of FIG. 1 may take place, by way of example only, at location A, which is the lowermost hinge (2) for the right-hand door (1).

The hinge assembly at location A is therefore provided with a receiving location, in the form of circular hole (21) which will be in registry with a corresponding hole (21*a*) formed in the corresponding mounting bracket (11), when the associated door (1) is in the closed position. A frangible customs seal (10) can then be inserted into the holes (21, 21*a*) when they are in registry, and the nature of the seal is such that it is frangible, and has to be broken before authorised opening of the door takes place. In the event of unauthorised opening of the door, there will be clear visible evidence of this fact when customs inspection takes place.

In a preferred development, the hinge is extended towards the door to provide a shoulder (9) which can contact the door frame when the container is subjected to twisting (racking) loads during transportation. The limiting of such racking movement is intended to eliminate any possibility of the customs seal being damaged during normal shipping and handling operations.

The invention claimed is:

1. A freight container having two access doors hingedly mounted at one end of the container via respective sets of hinges and mounting brackets which connect one edge of each door to a respective container door post;

characterised in that at least one hinge and corresponding mounting bracket have co-operating receiving holes arranged to receive a customs seal when the corresponding door is in a closed position such that when the seal is in engagement with the receiving holes the hinge is prevented from pivoting movement relative to the bracket.

2. A freight container according to claim 1, characterised in that one of the doors has an overlap with the other door, when both doors are in the closed position, and in that the hinge and corresponding mounting bracket provided with said co-operating receiving holes are arranged to mount said one door on the end of the container.

3. A freight container according to claim 1, characterised in that the hinge has an extended shoulder arranged to contact the door frame when the container is exposed forces during transportation, in order to protect the customs seal from damage during normal usage.

4. A freight container according to claim 1, characterised by provision of a frangible customs seal receivable by said receiving holes when the doors are in the closed position.

* * * * *

UNITED STATES PATENT AND TRADEMARK OFFICE

CERTIFICATE OF CORRECTION

PATENT NO. : 7,341,305 B2
APPLICATION NO. : 10/566023
DATED : March 11, 2008
INVENTOR(S) : Kenneth Reynard It is certified that error appears in the above-identified patent and that said Letters Patent is hereby corrected as shown below:

In column 4 line 13, please delete "when the container is exposed forces" and replace it with --when the container is exposed to twisting (racking) forces--.

Signed and Sealed this

Twenty-sixth Day of August, 2008

JON W. DUDAS
*Director of the United States Patent and Trademark Office*